(12) United States Patent
Yoon et al.

(10) Patent No.: US 9,806,346 B2
(45) Date of Patent: Oct. 31, 2017

(54) DIRECT REFORMING CATALYST FOR MOLTEN CARBONATE FUEL CELLS, METHOD FOR PREPARING THE SAME AND METHOD FOR IMPROVING LONG-TERM STABILITY THEREOF BY WETTABILITY CONTROL ON MOLTEN CARBONATE ELECTROLYTE

(71) Applicant: KOREA INSTITUTE OF SCIENCE AND TECHNOLOGY, Seoul (KR)

(72) Inventors: Sung Pil Yoon, Seoul (KR); Hyoung-Juhn Kim, Seoul (KR); Chang Won Yoon, Seoul (KR); Seong Cheol Jang, Seoul (KR); Sun-Hee Choi, Seoul (KR); Jonghee Han, Seoul (KR); Hyung Chul Ham, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/791,656

(22) Filed: Jul. 6, 2015

(65) Prior Publication Data
US 2016/0006040 A1 Jan. 7, 2016

(30) Foreign Application Priority Data
Jul. 7, 2014 (KR) ........................ 10-2014-0084432

(51) Int. Cl.
*H01M 4/90* (2006.01)
*H01M 8/14* (2006.01)
*C04B 35/47* (2006.01)

(52) U.S. Cl.
CPC ........... *H01M 4/9033* (2013.01); *C04B 35/47* (2013.01); *H01M 8/145* (2013.01); *C04B 2235/327* (2013.01); *C04B 2235/768* (2013.01); *C04B 2235/9669* (2013.01); *H01M 2008/147* (2013.01); *Y02E 60/526* (2013.01); *Y02P 70/56* (2015.11)

(58) Field of Classification Search
CPC ............... H01M 4/9033; H01M 8/145; H01M 2008/147; C04B 35/47; C04B 2235/327; C04B 2235/768; C04B 2235/9669; Y02P 70/56; Y02E 60/526
See application file for complete search history.

(56) References Cited

U.S. PATENT DOCUMENTS

| 4,467,050 A | 8/1984 | Patel et al. |
| 4,546,091 A | 10/1985 | Sheppard et al. |
| 4,774,152 A | 9/1988 | Matsumura et al. |
| 4,788,110 A | 11/1988 | Bernard et al. |
| 5,622,790 A | 4/1997 | Dicks et al. |
| 6,800,388 B2 * | 10/2004 | Kaneko ................. B01J 23/002 429/479 |
| 2004/0204315 A1 * | 10/2004 | Krumpelt ............... B01J 23/002 502/303 |
| 2012/0201745 A1 * | 8/2012 | Noronha ................ B01J 23/002 423/648.1 |

FOREIGN PATENT DOCUMENTS

| JP | 05190194 A | 7/1993 |
| JP | 06339633 A | 12/1994 |
| KR | 1457098 B1 * | 11/2014 |

OTHER PUBLICATIONS

Kulkarni et al., "Electrochemical performance of direct carbon fuel cells with titanate anodes," Electrochimica Acta 121 (2014) 34-43: Published online Jan. 3, 2014.*
Gurav et al., "Carbon dioxide reforming of methane over ruthenium substituted strontium titanate perovskite catalysts," Indian Journal of Chemistry, vol. 51A, Sep.-Oct. 2012, pp. 1339-1347.*
Berger et al., Deactivation Behaviour of Nickel Catalysts used for Internal Reforming in Molten Carbonate Fuel Cells, Natural Gas Conversion II, 1994 , pp. 309-314, Elsevier Science B.V.
Cavallaro et al., "Alkali effect on the MCFC-internal reforming catalyst life", Int. J. Hydrogen Energy, 1992, pp. 181-186, vol. 17, No. 3.
Rostrup-Nielsen et al., Internal steam reforming in fuel cells and alkali poisoning, Applied Catalysis A, Jan. 26, 1995, pp. 381-390 , vol. 126, Elsevier, Denmark.
Hirai et al., Proc. 3rd Int. Symp. Carbonate Fuel Cell Technol., The Electrochemical Society, Pennington, NJ, 1993, p. 146-157.
Iijima et al., Fuel Cell Seminar, San Diego, CA, 1994, p. 226-229.
Zhang, et al., 223rd ECS meeting, Abstract #368, 2013.
Kimihiko Sugiura, Degradation Phenomena of Reforming Catalyst in DIR-MCFC, Applications of Gas Chromatography, 2012, pp. 66-82, InTech, Japan.
Delmastro et al., Synthesis and characterization of non-stoichiometric LaFe03 perovskite, Materials Science and Engineering , 2001, pp. 140-145, vol. 79, Elsevier.
Cuffini et al., Crystallographic, Magnetic, and Electrical Properties of SrTi1-xRux03 Perovskite Solid Solutions , Journal of Solid State Chemistry, 1993, pp. 161-170, vol. 105, No. 1.

* cited by examiner

*Primary Examiner* — Anthony J Zimmer
(74) *Attorney, Agent, or Firm* — Goldilocks Zone IP Law

(57) ABSTRACT

Disclosed is a homogeneous catalyst having a single phase of Perovskite oxide, wherein at least one doping element is substituted at site A, site B or sites A and B in $ABO_3$ Perovskite type oxide so that the wettability with a liquid molten carbonate electrolyte may be decreased. The catalyst may have high catalytic activity, inhibit catalyst poisoning caused by creepage and evaporation of a liquid molten carbonate electrolyte, maintain high reaction activity for a long time, provide high methane conversion, and allow production of synthetic gas having a high proportion of hydrogen.

1 Claim, 9 Drawing Sheets

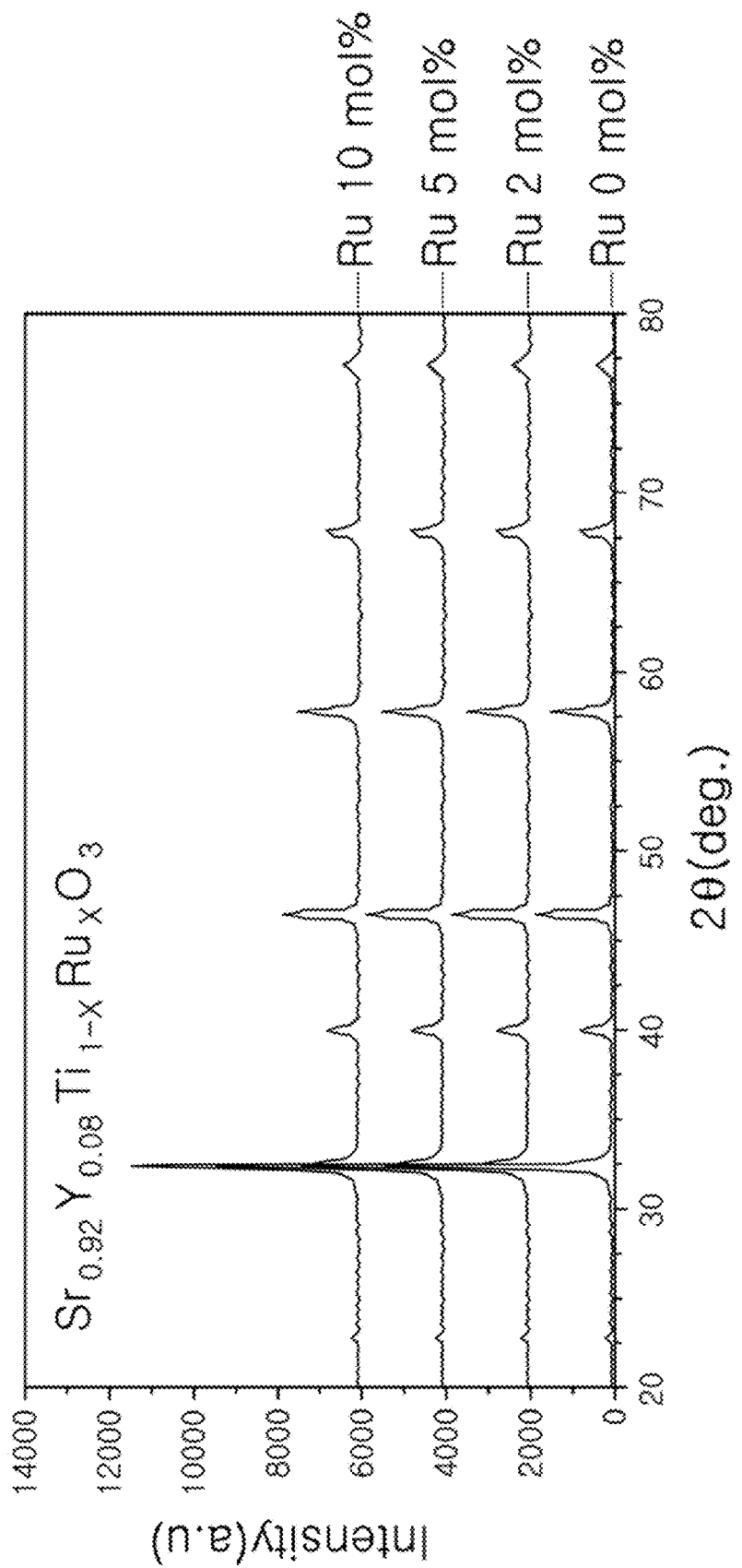

DIRECT REFORMING CATALYST FOR MOLTEN CARBONATE FUEL CELLS, METHOD FOR PREPARING THE SAME AND METHOD FOR IMPROVING LONG-TERM STABILITY THEREOF BY WETTABILITY CONTROL ON MOLTEN CARBONATE ELECTROLYTE

CROSS-REFERENCE TO RELATED APPLICATION

This application claims priority to Korean Patent Application No. 10-2014-0084432, filed on Jul. 7, 2014, and all the benefits accruing therefrom under 35 U.S.C. §119, the contents of which in its entirety are herein incorporated by reference.

BACKGROUND

1. Field

The present disclosure relates to a direct reforming catalyst for molten carbonate fuel cells, a method for preparing the same, and a method for improving a long-term stability of the direct reforming catalyst for molten carbonate fuel cells by controlling wettability to a molten carbonate electrolyte. A molten carbonate fuel cell using the above-mentioned direct reforming catalyst may be used widely in various systems using molten carbonate fuel cells, including large-scale distributed generation, concentration of carbon dioxide, or the like.

2. Description of the Related Art

Currently, catalysts such as nickel as a main ingredient supported on a porous inorganic carrier, such as magnesium oxide (MgO) or alumina ($Al_2O_3$) are used for direct reforming (or direct internal reforming, DIR) of a molten carbonate fuel cells. Typical examples of such catalysts that are commercially available may include those developed by Haldo-Topsoe Company (Denmark), British Gas (BG) Company (England) and Mitsubishi Electric Corporation (Japan).

Particularly, the catalyst developed by Haldo-Topsoe Company (Denmark) includes 10-40 wt % of Ni dispersed on a carrier containing MgO mixed with about 10% of $Al_2O_3$.

The catalyst developed by BG Company (England) includes Ni dispersed on a metal oxide carrier containing Al as a main ingredient mixed with Mg and Cr.

The catalyst developed by Mitsubishi Electric Corporation (Japan) includes Ni dispersed on an $MgAl_2O_4$ carrier.

However, such commercially available water vapor reforming catalysts used in internal reforming, particularly direct internal reforming, are subjected to poisoning since they are inevitably in contact with molten carbonate during the fuel cell operation. Thus, the carriers and Ni are sintered rapidly and the activity of the catalyst itself for reforming hydrocarbons into hydrogen is degraded, so that the quality and lifespan of a molten carbonate fuel cell may not be maintained at a level required for commercialization.

Due to this, many studies have been conducted to increase the lifespan of a direct reforming catalyst for molten carbonate fuel cells.

The studies according to the related art may be classified into approaches of interrupting a creepage path of electrolyte ingredients to a catalyst through improvement of catalyst packing or modification of the internal structure of a fuel cell, and approaches of developing a catalyst material having excellent anti-poisoning property against electrolyte ingredients.

With respect to the former approaches, Energy Research Corporation (ERC) (USA) have disclosed, in U.S. Pat. No. 4,467,050 (Patent Document 1), a method for manufacturing a plate-like catalyst body by forming an inorganic carrier layer on a stainless steel plate through an electrophoresis process, followed by impregnation with a catalytically active material, and mounting the plate-like catalyst body into a fuel cell. Additionally, in U.S. Pat. No. 4,788,110 (Patent Document 2), ERC have disclosed a method for reducing contact of carbonate vapor with a catalyst by mounting a structure made of a stainless steel plate between an anode and catalyst pellets, as well as a method for reducing contact of carbonate vapor with a catalyst by inserting carbonate-absorbing pellets between catalyst pellets.

In addition, Mitsubishi Electric Corporation (MELCO) (Japan) have disclosed, in U.S. Pat. No. 4,774,152 (Patent Document 3), a method for coating the surfaces of catalyst pellets with a carbonate-absorbing material comprising Al, Si and Cr as main ingredients, a method for mixing the carbonate-absorbing material with catalyst powder, or a method for placing the carbonate-absorbing material as an independent carbonate-absorbing layer on a catalyst layer.

However, although the above-mentioned methods have succeeded in increasing the lifespan of a catalyst to a certain degree, it is still insufficient as compared to 40,000 hours required for commercialization, and as well they has an additional problem of cost increase related with a manufacture of a separator caused by the modification of an internal structure.

Meanwhile, with respect to the latter approaches, in general a selection of a carrier strongly resistant to electrolyte vapor has been required so as to reinforce the anti-poisoning property of a catalyst against electrolyte ingredients. Typical examples of such carriers may include lithium aluminate or magnesia, and some catalysts including Ni supported on such carriers have been studied [Non-Patent Documents 1-4].

Particularly, Giordano et. al [Non-Patent Document 2] have disclosed that Ni in a catalyst using magnesia as a carrier are distributed well on the lattice of the carrier, and thus is more efficient as compared to Ni catalyst supported on lithium aluminate.

In addition, Paetsh and Kishida have disclosed that after Ni/MgO catalyst was used to carry out an experiment of water vapor reforming of methane in a 10-cell stack test, it was possible to increase the conversion empirically to 100% at 640° C. under a molar ratio of water vapor/methane of 2.5 [Non-Patent Document 3].

Additionally, Rostrup-Nielsen and Christiansen [Non-Patent Document 5] have disclosed that a catalyst including Ni or a noble metal ingredient, such as Ru, Rh or Pt etc., supported on $MgAl_2O_4$ carrier was used to operate a 7 kW-scale pilot plant for 3500 hours or more.

Further, recently, there have been reported applications of catalysts including ruthenium or rhodium supported on zirconia [Non-Patent Documents 6-9].

Meanwhile, Netherland Energy Research Foundation (ECN) (Netherland) and BG (England) have disclosed, in U.S. Pat. No. 4,546,091 (Patent Document 4) and U.S. Pat. No. 5,622,790 (Patent Document 5), a method for preparing a novel catalyst by supporting the Feitnecht compound containing Ni, Mg, Cr and Al on kaolin or bentonite to produce a catalyst precursor, and reported that the catalyst was highly resistant to poisoning with carbonate vapor.

In addition, ERC (Netherland) have studied a method for inhibiting carbon deposition by using Co as a cocatalyst, and BG (England) have studied a method for increasing anti-poisoning property by adding K as a cocatalyst in order to enhance reduction capability of Ni.

However, despite the above-mentioned studies, lifespan of catalysts have not yet reached to a target level required for commercialization. Moreover, in fact, precise mechanisms of catalyst poisoning have not yet been understood clearly.

In this regards, according to the recent report [Non-Patent Document 10] of FCE Company, it is reported that a catalyst is poisoned with a molten carbonate electrolyte due to an electrolyte creepage phenomenon through wet seals, or a direct reforming (or direct internal reforming, DIR) catalyst for a molten carbonate fuel cell undergoes degradation of catalytic activity by at least 70% while it is exposed to electrolyte vapor for a long time.

In other words, it is known that vapor of alkaline ingredients generated from a liquid electrolyte is mixed with fuel gas and then is in contact with a catalyst so that a large amount of alkaline ingredients may be crept to a catalyst, and then the active surface of catalyst is partially or totally covered with the alkaline ingredients, resulting in a decrease in catalytically active sites and further resulting in sintering of a carrier and nickel.

In addition to the above, sintering of a catalyst caused by an electrolyte, pore occlusion of a catalyst and dissolution of catalyst oxidation products, etc. are pointed out as the causes of degradation of catalytic activity.

In brief, in the case of a molten carbonate fuel cell, a catalyst is poisoned and loses the catalyst activity due to creepage of liquid carbonate or carbonate-related vapor ($K_2CO_3$, $Li_2CO_3$, $Na_2CO_3$ vapor or KOH, LiOH, NaOH vapor, etc.), resulting in degradation of lifespan of a whole fuel cell [Non-Patent Document 11]. As known from the above documents, some studies have been conducted to inhibit electrolyte poisoning of a direct reforming catalyst for a molten carbonate fuel cell. However, according to the related art, there have been many problems such as an incomplete interruption of carbonate creepage to a catalyst layer, or a consumption of the carbonate electrolyte in a matrix due to an introduction of a carbonate-absorbing layer which in turn makes it difficult to operate a fuel cell for a long time.

REFERENCES

Patent Documents (Patent Document 1) U.S. Pat. No. 4,467,050
(Patent Document 2) U.S. Pat. No. 4,788,110
(Patent Document 3) U.S. Pat. No. 4,774,152
(Patent Document 4) U.S. Pat. No. 4,546,091
(Patent Document 5) U.S. Pat. No. 5,622,790

Non-Patent Documents (Non-Patent Document 1) R. J. Berger, E. B. M. Doesburg, J. G. van Ommen and J. R. H. Ross, "Natural Gas Conversion II", Elsevier, Amsterdam, 1994, p. 309.
(Non-Patent Document 2) S. Cavallaro, S. Freni, R. Cannistraci, M. Aquino and N, Giordano, Int. J. Hydrogen Energy, 17(3), 181 (1992).
(Non-Patent Document 3) L. Paetsch et al., Molten Carbonate Fuel Cell Development, Final Report for 1981-1987, DOE/DE-AC21-76ET11304, Danbury, Conn., Energy Research Corporation, April, p. 213, 1987.
(Non-Patent Document 4) R. J. Berger, E. B. M. Doesburg, J. G. van Ommen and J. R. H. Ross, Catal. Sci. Tech., 1, 455(1991).
(Non-Patent Document 5) J. R. Rostrup-Nielsen and L. J. Christiansen, App. Catal. A, 126, 381(1995).
(Non-Patent Document 6) Tonen Corporation. Tokyo, JP Patent No. 6-339633, 1993.
(Non-Patent Document 7) Tonen Corporation. Tokyo, JP Patent No. 5-190194, 1990.
(Non-Patent Document 8) C. Hirai., M. Matsumra and A. Sasaki, Proc. 3rd Int. Symp. Carbonate Fuel Cell Technol., The Electrochemical Society, Pennington, N.J., 1993, p. 146-157.
(Non-Patent Document 9) M. Ijima, J. Tanka, A. Sasaki, T. Nakajima, K. Harima and Y. Miyake, Fuel Cell Seminar, San Diego, Calif., 1994, p. 226-229.
(Non-Patent Document 10) Rui Zhang, et. al., 223rd ECS meeting, 2103, Abstract #368, 2013.
(Non-Patent Document 11) Kimihiko Sugiura (2012). Degradation Phenomena of Reforming Catalyst in DIR-MCFC, Applications of Gas Chromatography, Dr. Reza Davarnejad (Ed.), ISBN:978-953-51-0260-1, InTech [Available from: http://www.intechopen.com/books/applications-of-gas-chromatography/degradation-phenomena-of-reformingcatalyst-in-dir-mcfc]

SUMMARY

The present disclosure is directed to providing a catalyst useful as a direct reforming catalyst for internal reforming type molten carbonate fuel cells, the catalyst having excellent catalytic activity and high anti-poisoning property against a molten carbonate electrolyte, and thus having excellent long-term stability, as compared to the conventional molten carbonate direct reforming catalysts.

Particularly, the present disclosure is directed to providing a direct reforming catalyst for molten carbonate fuel cells, which may be inhibited from poisoning caused by creepage of an electrolyte to a catalyst layer and by carbonate vapor, cause no sintering of Ni particles even when exposed to the same amount of carbonate vapor as in the conventional catalysts, and maintain its reduction capability to provide a high conversion and high hydrogen selectivity (molar ratio of the produced hydrogen to fuel consumed during the reaction) for a long time. The present disclosure is also directed to providing a method for preparing the catalyst, and a method for operating a molten carbonate fuel cell using the catalyst.

In some embodiments, there is provided a direct reforming catalyst for molten carbonate fuel cells, which is a homogeneous catalyst having a single phase of Perovskite oxide, wherein at least one doping element is substituted at site A, site B or sites A and B in $ABO_3$ Perovskite type oxide, and the substitution with the doping element decreases wettability with a liquid molten carbonate electrolyte as compared to wettability with a liquid molten carbonate electrolyte in non-substituted $ABO_3$ Perovskite type oxide.

In some embodiments, there is provided a method for preparing a direct reforming catalyst for molten carbonate fuel cells, which includes carrying out substitution with at least one doping element at site A, site B or sites A and B in $ABO_3$ Perovskite type oxide to provide a homogeneous catalyst of a single phase of Perovskite oxide, wherein the substitution with the doping element decreases wettability with a liquid molten carbonate electrolyte as compared to wettability with a liquid molten carbonate electrolyte in non-substituted $ABO_3$ Perovskite type oxide.

In some embodiments, there is provided a method for improving long-term stability of a direct reforming catalyst for molten carbonate fuel cells, which includes carrying out substitution with at least one doping element at site A, site B or sites A and B in $ABO_3$ Perovskite type oxide to provide a homogeneous catalyst of a single phase of Perovskite oxide, wherein the substitution with the doping element decreases wettability with a liquid molten carbonate electrolyte as compared to wettability with a liquid molten carbonate electrolyte in non-substituted $ABO_3$ Perovskite type oxide.

In some embodiments, there is provided a molten carbonate fuel cell including the direct reforming catalyst for molten carbonate fuel cells.

According to the molten carbonate direct reforming catalyst disclosed herein, the catalyst may be inhibited from poisoning caused by creepage of an electrolyte to a catalyst layer and by carbonate vapor, cause no sintering of Ni particles even when exposed to the same amount of carbonate vapor as in the conventional catalysts, and maintain its reduction capability to provide a high conversion and high hydrogen selectivity (molar ratio of the produced hydrogen to fuel consumed during the reaction) for a long time.

Therefore, the catalyst disclosed herein allows production of synthetic gas having a high proportion of hydrogen while maintaining high activity for a long time, and thus is very useful as a direct reforming catalyst in an internal reforming type molten carbonate fuel cell.

BRIEF DESCRIPTION OF THE DRAWINGS

FIG. 2 is a graph of X-ray Diffractometry (XRD) of each of the Examples 1 and 2 and Comparative Example 1, wherein x-axis shows 2θ (°) and y-axis shows intensity (arbitrary unit).

FIGS. 3a-3c are Transmission Electron Microscopic (TEM) images of each of the Example 2 and Comparative Example 2, wherein FIG. 3a shows the image of a loading catalyst according to the Comparative Example 2, FIG. 3b shows the image of the catalyst according to the Example 2, and FIG. 3c shows the analysis results of Energy Dispersive X-ray Spectroscopy (EDX) line profile according to the Example 2.

DETAILED DESCRIPTION

Figure 1:
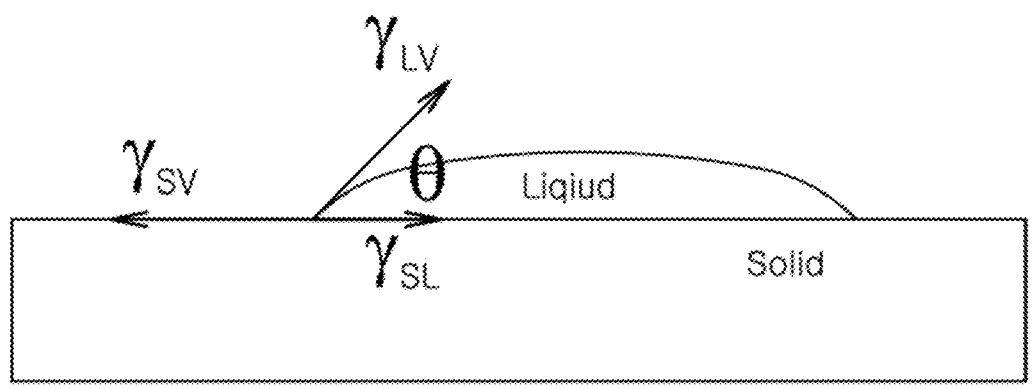
FIG. 1 is a schematic view illustrating the factors determining a wetting angle.

Example embodiments are described more fully hereinafter. The invention may, however, be embodied in many different forms and should not be construed as limited to the example embodiments set forth herein. Rather, these example embodiments are provided so that this disclosure will be thorough and complete, and will fully convey the scope of the invention to those skilled in the art. In the description, details of features and techniques may be omitted to more clearly disclose exemplary embodiments.

As used herein, the term 'operating conditions' means an operating temperature and condition of input gas to the anode/cathode in a molten carbonate fuel cell.

As used herein, the long-term stability of a catalyst means a property by which the conversion or hydrogen selectivity (molar ratio of the produced hydrogen to fuel consumed during the reaction) [i.e., catalytic activity] may be maintained at a level equal to or higher than as required, for a long time. Improving the long-term stability of a catalyst means improving the lifespan of a catalyst.

As used herein, the term 'homogeneous catalyst' means a catalyst that includes an active substance substituted in the lattice of a material and may maintain a single phase.

According to some embodiments, in order to decrease wettability of a molten carbonate direct reforming catalyst with a liquid molten carbonate electrolyte (i.e., in order to make the catalyst poorly wet with the electrolyte), there is provided a homogeneous catalyst of a single phase of Perovskite oxide, wherein at least one doping element is substituted at site A, site B or sites A and B in $ABO_3$ Perovskite type oxide, and the substitution with the doping element decreases wettability with a liquid molten carbonate electrolyte as compared to wettability with a liquid molten carbonate electrolyte in non-substituted $ABO_3$ Perovskite type oxide. The doping element may be one selected from the metal elements capable of reforming hydrocarbon fuel and having poor wettability (a large wetting angle) with a molten carbonate electrolyte at an operating temperature.

The molten carbonate direct reforming catalyst according to some embodiments has poor wettability (a large wetting angle, e.g., preferably a wetting angle θ>20°, more preferably a wetting angle θ>50°, even more preferably a wetting angle θ>90°) with a liquid molten carbonate electrolyte. Therefore, it is possible to inhibit poisoning of a catalyst caused by creepage of liquid carbonate or carbonate-related vapor ($K_2CO_3$, $Li_2CO_3$, $Na_2CO_3$ vapor or KOH, LiOH, NaOH vapor), and to prevent a liquid electrolyte from covering catalytically active sites of a reforming catalyst and causing degradation of the catalytic activity. As a result, it is possible to improve the long-term stability (lifespan) of a catalyst.

According to the related art, catalysts are generally non-homogeneous catalysts having two or more phases formed by heat treatment of active substances on a support. On the contrary, the catalyst disclosed herein is a single-phase homogeneous catalyst.

In this regards, it is possible to obtain a reforming catalyst by forming a second phase material (Ru, Rd, Au, Ni, Ag, Pd, Cu, Pt, or the like) having poor wettability (large wetting angle) with a liquid molten carbonate electrolyte on a Perovskite oxide (ABO₃) support. However, in this case, due to the wettability with the support, the catalyst may be poisoned easily with the liquid electrolyte. Moreover, the metal catalyst formed on the support is sintered as time goes by, resulting in a degradation of long-term stability.

Therefore, according to some embodiments, the above-mentioned doping element (Ru, Rd, Au, Ni, Ag, Pd, Cu, Pt, or the like) having poor wettability with a liquid molten carbonate electrolyte is substituted within the crystal lattice of Perovskite oxide (ABO₃), so that the catalyst may maintain a single phase. In this manner, the reforming catalyst as a whole has poor wettability with a liquid molten carbonate electrolyte, in other words, is not wet well with a liquid molten carbonate electrolyte. Thus, it is possible to inhibit catalyst poisoning and to prevent a surface change in catalyst caused by sintering.

In addition, the doping element does not exist in the form of a metal but exists as a partial element in the oxide, and thus has high thermal stability even at high temperature and is highly resistant against sintering, thereby allowing reforming at high temperature. For reference, conventional metal catalysts include those including a metal loaded on an alumina or titanium dioxide support [Ni/Al₂O₃, Ni/MgO, Ni/MgAl₂O₄, Ru/TiO₂, Rh/MgAl₂O₄; hereinafter, '/' is used to illustrate a metal-loaded catalyst]. However, such catalyst supports have high wettability with a molten carbonate electrolyte, and thus easily cause catalyst poisoning due to covering of catalytically active sites with electrolyte vapor or creepage during the operation of the direct reforming catalyst.

The catalyst disclosed herein is a direct reforming (or direct internal reforming, DIR) catalyst for fuel cells performing direct reforming of hydrocarbon fuel, particularly for molten carbonate fuel cells, and uses a single-phase catalyst having poor wettability with an electrolyte, thereby minimizing catalyst poisoning with a liquid electrolyte. A fuel cell using the catalyst disclosed herein may be operated stably for several ten thousands hours (e.g. at least 40,000 hours or more) under the operating conditions (direct reforming conditions) of a molten carbonate fuel cell.

According to an embodiment, the catalyst disclosed herein is a homogeneous catalyst of a single-phase of Perovskite oxide represented by the following Chemical Formula 1.

$$A_{1-x}C_xB_{1-y}D_yO_3 \qquad \text{[Chemical Formula 1]}$$

wherein x is equal to or larger than 0 and smaller than 1, and y is equal to or larger than 0 and smaller than 1, with the proviso that both x and y cannot represent 0.

A and B are elements different from each other and form site A and site B, respectively, in ABO₃ Perovskite type oxide, wherein A is an element having a valence of +2 and B is an element having a valence of +4. Herein, either or both of A and B may have reforming characteristics (properties). C and D are doping elements different from each other and have reforming characteristics (properties) to hydrocarbon fuel.

The $A_{1-x}C_xB_{1-y}D_yO_3$ type Perovskite oxide has lower wettability with a liquid molten carbonate electrolyte as compared to the ABO₃ type Perovskite oxide.

According to an embodiment, the wetting angle (θ) of the $A_{1-x}C_xB_{1-y}D_yO_3$ type Perovskite oxide with a liquid molten carbonate electrolyte is larger than 20°, preferably larger than 50° and more preferably larger than 90° under reductive atmosphere. The upper limit of wetting angle is 180°, which means no wetting with a liquid electrolyte.

For reference, determination of a wetting angle is well known in the art.

FIG. 1 is a schematic view illustrating the factors determining a wetting angle. As shown in FIG. 1, a wetting angle may be determined by gas/liquid/solid surface tension according to the following Young's equation.

$$Y_{SV}=Y_{SL}+Y_{LV}\cos\theta \qquad \text{[Mathematical Formula 1]}$$

wherein $Y_{SV}$ is solid/gas surface energy, $Y_{SL}$ is solid/liquid interfacial surface energy, $Y_{LV}$ is liquid/gas surface energy, and θ is a wetting angle.

That is, as the surface energy of solid decreases, the solid has lower wettability (i.e., larger wetting angle) with a liquid.

When the wetting angle (θ) is larger than 20°, it can be said that wettability is not high. When the wetting angle (θ) is larger than 50°, it can be said that wettability is low (poor). In addition, when the wetting angle (θ) is larger than 90°, it can be said that wettability is very poor.

According to an embodiment, a wetting angle may be one under the operating conditions of a molten carbonate fuel cell, i.e., may be a wetting angle under the operating temperature and gaseous condition. For reference, a molten carbonate electrolyte becomes liquid at the operating temperature, while it is in a solid state at room temperature.

Meanwhile, A in Chemical Formula 1 is an element with a valence of +2 and B is an element with a valence of +4. For example, A may include Sr and B may include Ti.

According to an embodiment, each of C and D in Chemical Formula 1 represents Ru, Rd, Au, Ag, Pd, Cu, Ni or Pt. Substitution (Doping) with a trace amount of C and D as noble metals at site A and/or site B advantageously decreases the amount of noble metals as compared to the conventional catalysts (non-homogeneous catalysts) using noble metals.

According to a particular embodiment, y=0 and 0<x≤0.5. According to another particular embodiment, x=0 and 0<y≤0.5. According to still another particular embodiment, 0<x≤0.5 and 0<y≤0.5.

Herein, x and y may be controlled in view of maintenance of a single phase, variations in wettability with a liquid molten carbonate electrolyte and reforming quality (catalytic activity).

According to an embodiment, the molten carbonate direct reforming catalyst may be provided and used in the form of pellets. As described above, when a catalyst is prepared by using a catalyst material having poor wettability with a liquid molten carbonate electrolyte, even the use of pellets obtained from the catalyst may solve the problem of occlusion of pore openings caused by an electrolyte and a failure in transfer of reaction gases into the catalyst inside the pellets. As a result, it is possible to ensure the long-term stability of a catalyst.

For example, the catalyst disclosed herein may maintain a methane conversion of about 80% or higher for 200 hours or more under an operating condition of 500-700° C.

According to an embodiment, the liquid molten carbonate electrolyte may be a Li/K-based, Li/Na-based or Li/K/Na-based liquid molten carbonate electrolyte.

According to an embodiment, the catalyst is a water vapor reforming catalyst. In other words, the catalyst may be useful as a direct water vapor reforming catalyst in a molten carbonate fuel cell (MCFC).

Hereinafter, a non-limiting example embodiment of the present disclosure will be explained.

According to an embodiment, there is provided a homogeneous catalyst of a single phase obtained by substituting (doping) a part of titanium (Ti) of $SrTiO_3$ Perovskite material with ruthenium (Ru; the wetting angle of Ru with a Li/K-based liquid electrolyte is 92° under the operating condition of the corresponding liquid electrolyte (the wetting angle is measured under reductive atmosphere (e.g. at 650° C. under hydrogen atmosphere)), so that ruthenium is doped within the lattice structure of $SrTiO_3$ Perovskite. The obtained catalyst may be represented by the following Chemical Formula 2.

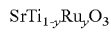  [Chemical Formula 2]

$SrTi_{1-y}Ru_yO_3$

Thus, although $SrTiO_2$ has an $ABO_3$ type Perovskite structure, a part of titanium (Ti) is substituted with ruthenium (Ru) at site B and a single phase having a basic Perovskite structure is maintained as determined by XRD analysis.

As described above, ruthenium substituted at the titanium site (site B in a Perovskite structure) does not exist as a metal but exists as a partial element in the oxide within the catalyst represented by Chemical Formula 2. Therefore, it is possible to enhance the thermal stability. In addition, substitution with ruthenium at the titanium site (site B in a Perovskite structure) provides a beneficial effect of inhibiting wetting with a liquid molten carbonate electrolyte (particularly a wetting angle θ>20°, more particularly θ>50°, even more particularly θ>90°.

In Chemical Formula 2, in view of maintenance of a single phase, variations in wettability with a liquid molten carbonate electrolyte and reforming quality (catalytic activity), the amount of ruthenium with which the titanium site is substituted, i.e., y may be larger than 0 and smaller than 1, particularly larger than 0 and equal to or smaller than 0.3. Although a single phase is maintained when y is larger than 0.3 and smaller than 1, the desired effect may not be sufficient as compared to a range of y≤3 in view of variations in wettability with a liquid molten carbonate electrolyte and reforming quality. Moreover, in this case, the noble metal, ruthenium, is used in a larger amount, resulting in an increase in cost.

The catalyst may include ruthenium substituted (doped) at the titanium site of $SrTiO_3$ Perovskite structure, and thus may have higher thermal stability as compared to the conventional metal catalysts, be not subjected to sintering, and thus allow reforming even at high temperature.

In addition, the catalyst may provide stable quality without poisoning caused by a liquid carbonate electrolyte, such as a Li/K-based electrolyte, under the operating condition of a molten carbonate fuel cell (e.g. 500-700° C. or 550-700° C.). For example, the catalyst may provide a methane conversion of about 82% or higher under the operating condition of 650° C. (see FIG. 5), and may maintain a methane conversion of about 80% or higher even when it is forced to be poisoned with an electrolyte by being mixed with 10 wt % of a Li/K-based molten carbonate electrolyte based on the weight of catalyst (see FIG. 6).

Further, in the catalyst, a trace amount of noble metal, ruthenium, is substituted (doped) at the titanium site of $SrTiO_3$. Thus, the catalyst may significantly reduce the amount of noble metal as compared to the conventional catalysts (non-homogeneous catalysts) using a noble metal. For reference, the conventional noble metal-based catalyst uses for example at least 3 wt % of noble metal based on the weight of support. On the contrary, the catalyst disclosed herein may reduce the amount of noble metal to 0.5 wt % or less based on the weight of catalyst.

The catalyst disclosed herein may be obtained by using a known dry process for preparing a catalyst, such as a citric acid process or the Pechini process, or a solid state mixing process. Since the catalyst disclosed herein is a single-phase homogeneous catalyst, it is possible to reduce the number of operations required for synthesizing a catalyst as compared to the conventional double or more-phase catalysts or non-homogeneous catalysts.

A general solid state mixing process includes mixing oxide powders to form a single phase at high temperature. For example, in the case of the catalyst represented by Chemical Formula 2, SrO oxide powder, $TiO_2$ oxide powder and $RuO_2$ oxide powder are mixed to form a single phase of $SrTi_{1-x}Ru_xO_3$ at high temperature.

A citric acid process includes forming a gel-like amorphous metal composite by using citric acid and firing the composite to obtain a single-phase catalyst. Particularly, in the case of the Pechini process, ethylene glycol is further added to induce polymerization with citric acid, thereby facilitating the formation of a composite from metal precursors [see the following Examples]. The solid state mixing process provides powder having a large particle size and small specific surface area, and thus is not suitable for the preparation of a catalyst. The citric acid process or particularly the Pechini process may be used preferably.

The examples according to some embodiments will now be explained in detail. However, the present disclosure is not limited to the following examples. It will be understood by those skilled in the art that various changes in form and details may be made thereto without departing from the spirit and scope of the present disclosure as defined by the appended claims, and the following examples make the present disclosure complete and help those skilled in the art to practice the present disclosure with ease.

Examples and Comparative Examples

Direct reforming catalysts for molten carbonate fuel cells represented by $SrTi_{1-y}Ru_yO_3$ [y=0.03 (Ex. 1), 0.05 (Ex. 2)] are synthesized through the Pechini process.

Strontium nitrate [$Sr(NO_3)_3 \cdot H_2O$ (available from Aldrich Co.)] is dissolved in deionized water at once. Titanium isopropoxide {$Ti[OCH(CH_3)_2]_4$} (Aldrich) and ruthenium chloride ($Cl_3Ru \cdot xH_2O$) (Aldrich), ethanol (99.9%) and $NH_3OH$ are added thereto, and then ethylene glycol and citric acid are introduced thereto and dissolved for stabilization. The solutions are mixed with each other for 24 hours, dried at 80° C. and calcined at 700° C. in the air. Finally, the resultant product is heat treated at 1000° C. for 5 hours.

Meanwhile, as Comparative Example 1, a catalyst non-doped with ruthenium (y=0) (i.e., $SrTiO_3$; also referred to as STO hereinafter) is obtained by the Pechini process.

That is, $N_2O_6Sr$ (Aldrich) and $Ti[OCH(CH_3)_2]_4$ (Aldrich) are mixed in deionized water, ethanol (99.9%) and $NH_3OH$ are added thereto, and then ethylene glycol and citric acid are introduced thereto to obtain aqueous nitrate solution, which, in turn, is dried at 80° C. and calcined at 600° C. in the air. Finally, the resultant product is heat treated at 1000° C. for 5 hours.

Meanwhile, as Comparative Example 2, doping with ruthenium is not carried out but 0.54 wt % of ruthenium is mixed with $SrTiO_3$ (in other words, Ru/STO containing 0.54 wt % of ruthenium loaded thereon based on the total weight of $SrTiO_3$ and ruthenium taken as 100). This catalyst is obtained by impregnating the catalyst according to Comparative Example 1 with ruthenium chloride ($Cl_3Ru \cdot xH_2O$).

X-ray Diffractometry (XRD) is carried out by using an X-ray diffractometer (Rigaku; RINT-5200 Model). Each of the samples is determined in a range of 2θ=20° to 80°.

FIG. 2 is a graph of X-ray Diffractometry (XRD) of each of the Examples 1 and 2 and Comparative Example 1, wherein x-axis shows 2θ (°) and y-axis shows intensity (arbitrary unit).

As shown in FIG. 2, the catalysts according to the Examples are single-phase homogeneous catalysts having a Perovskite structure.

Meanwhile, the Example 2 and Comparative Example 2 are subjected to high-resolution Transmission Electron Microscopy (TEM) image analysis. HRTEM (FEI, Tecnai F20) is used as the analytical instrument.

Figure 3A:
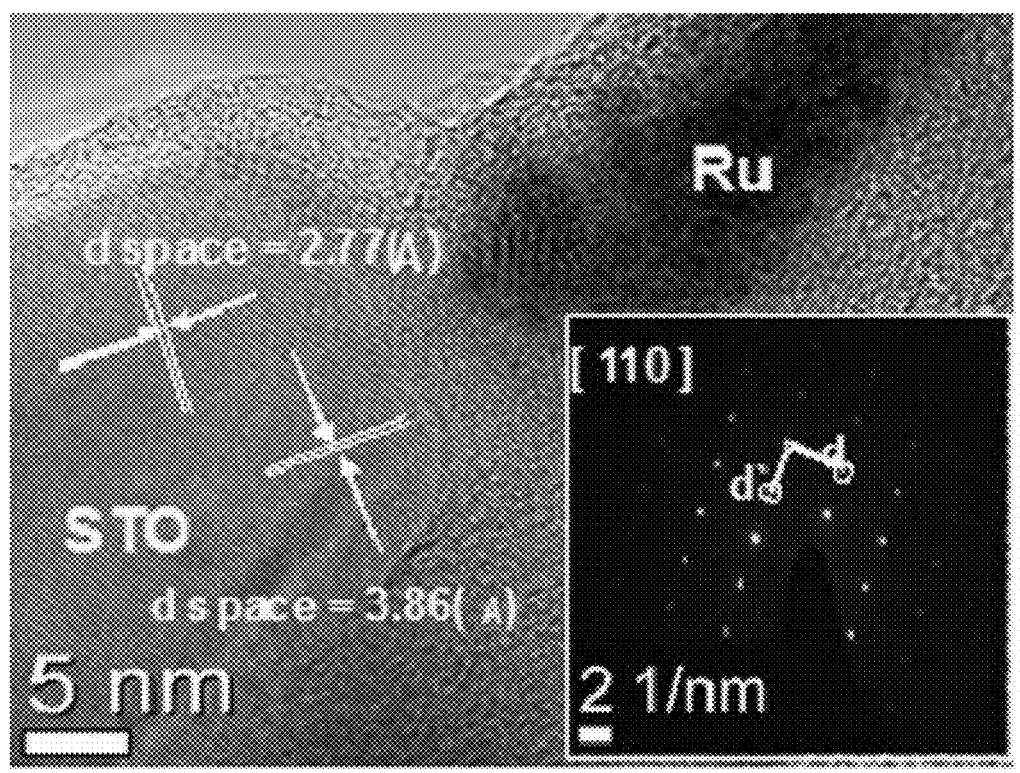
Figure 3B:
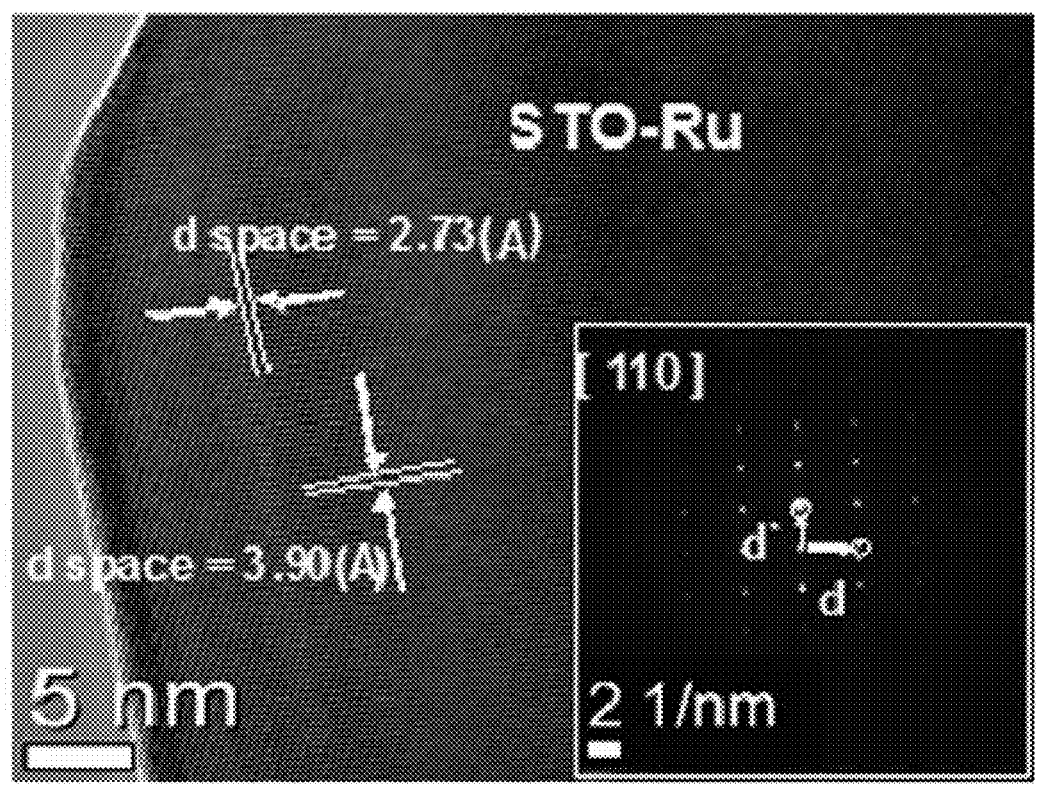
Figure 3C:
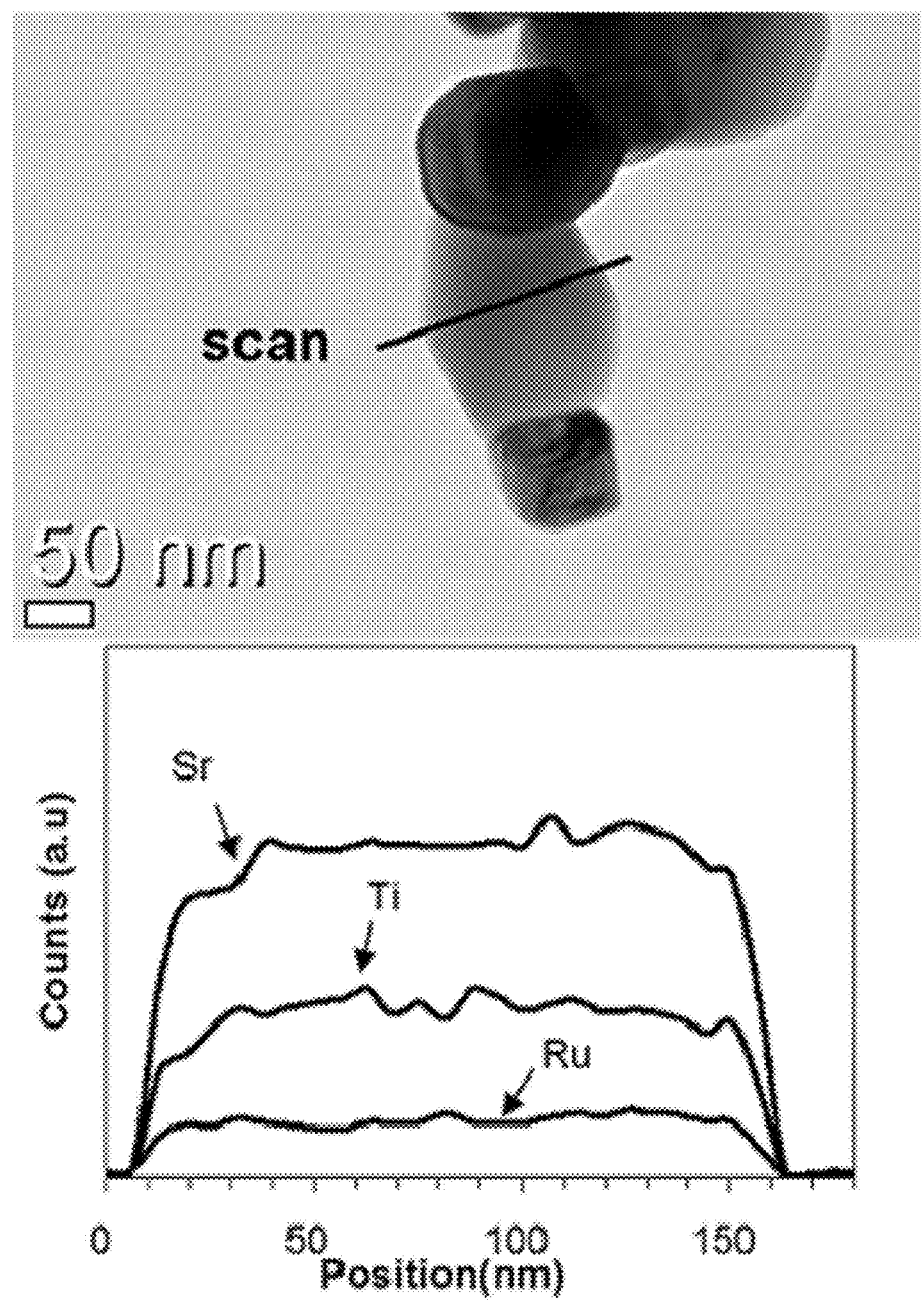

FIGS. 3a-3b are high-resolution TEM images of each of the Example 2 and Comparative Example 2, wherein FIG. 3a shows the image of a loading catalyst according to the Comparative Example 2, FIG. 3b shows the image of the catalyst according to the Example 2, and FIG. 3c shows the analysis results of Energy Dispersive X-ray Spectroscopy (EDX) line profile according to the Example 2.

As can be seen from FIG. 3a, in the case of the catalyst according to the Comparative Example 2, most of the loaded ruthenium particles are observed on the surface of STO. In contrast, in the case of the catalyst according to the Example 2, ruthenium is distributed homogeneously in a microstructure, and such a homogeneous distribution of ruthenium can be also seen from the EDS line profile in FIG. 3c. This suggests that while the loading type catalyst of the Comparative Example 2 has two phases, the catalyst according to the Example 2 is a single-phase homogeneous catalyst.

Meanwhile, a wetting angles for the catalyst according to the Example 1 is determined.

Figure 4:
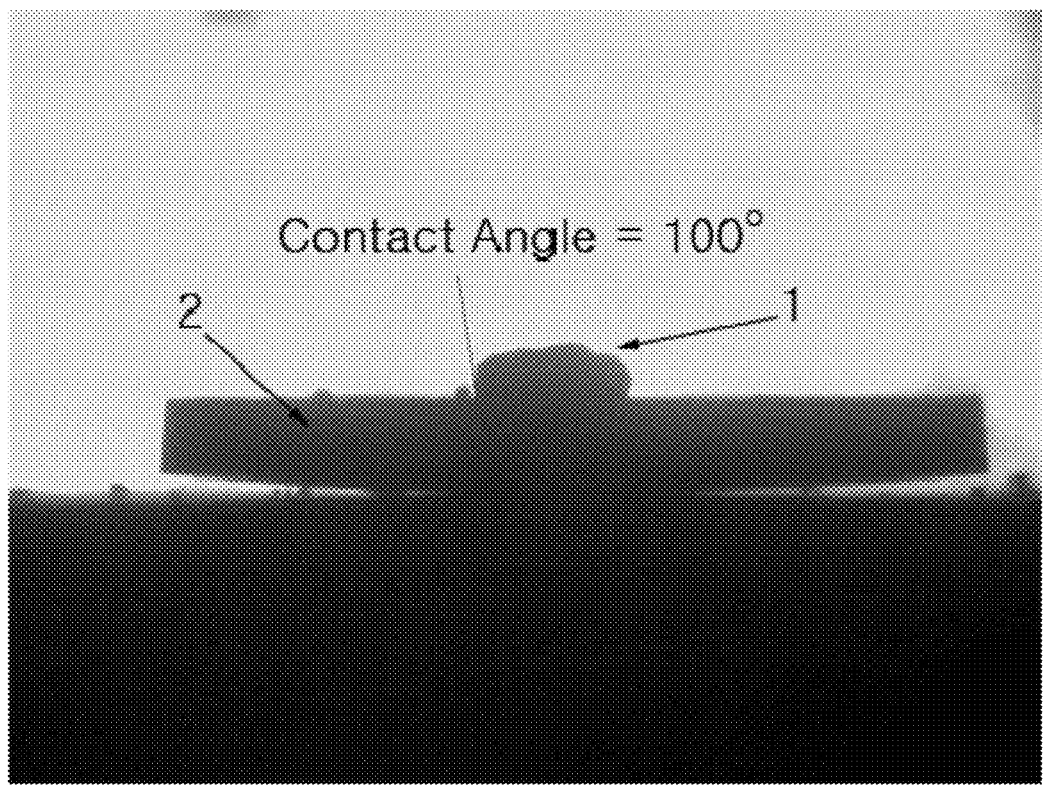
FIG. 4 shows results of measurement of a wetting angle at 600° C. under atmosphere of $H_2:N_2=10:90$, when varying the wettability of Perovskite oxide with a Li/K-based molten carbonate electrolyte through doping with ruthenium (Ru) according to the Example 1.

FIG. 4 shows results of measurement of a wetting angle at, for example, 600° C. under atmosphere of $H_2:N_2=10:90$ ($H_2$ 10 sccm, $N_2$ 90 sccm), when varying the wettability of Perovskite oxide with a Li/K-based molten carbonate electrolyte through doping with ruthenium (Ru) according to Example 1. In FIG. 4, the numeral 1 denotes the $(Li/K_2)CO_3$ molten carbonate, and the numeral 2 denotes the catalyst, $SrTi_{0.97}Ru_{0.03}O_3$.

As can be seen from FIG. 4, the wetting angle is approximately 100°.

Under the same conditions, the wetting angles of the Example 2, and Comparative Examples 1 and 2 are determined. The wetting angle of the Comparative Example 2 is less than about 40° and that of the Comparative Example 1 is less than about 20°. The wetting angle of the Example 2 is about 100°.

[Experiment 1]

To determine a catalytic activity, in a fixed-bed continuous flow system under atmospheric pressure, catalytic reactions (water vapor reforming of methane) using each of the catalysts according to the Example 1 and Comparative Examples 1 and 2 are carried out, wherein the first test is carried out by mounting each catalyst alone in the system, and the second test is carried out by mixing each catalyst with 20 wt % of molten carbonate including 62 mol % $Li_2CO_3$/38 mol % $K_2CO_3$. based on the weight of the catalyst.

As an out-of-cell reactor, a quartz tube (internal diameter 2 mm) is used. Each catalyst (20 mg) is positioned at the center of the reactor. Before the test, each catalyst is subjected to in-situ reduction under the flow of diluted hydrogen gas (10% $H_2$/Ar) at 650° C. for 2 hours.

The operating temperature is set to 550-700° C. The feed gas used for reforming includes $CH_4/H_2O/N_2$ (molar flux ratio: 10 sccm/25 sccm/20 sccm).

Weight hourly space velocity (WHSV: mass flow of reactant divided by mass of catalyst) is 12 $L/h \cdot g_{cat}$.

A gas chromatography system (GC, Agillent 6900 Model) equipped with a thermal conductivity detector (TCD) is used to analyze the reactants. Conversion of methane is calculated according to the following formula.

$$CH_{4, conversion} = [(CH_{4, in} - CH_{4, out})/CH_{4, in}] \times 100$$

Figure 5:
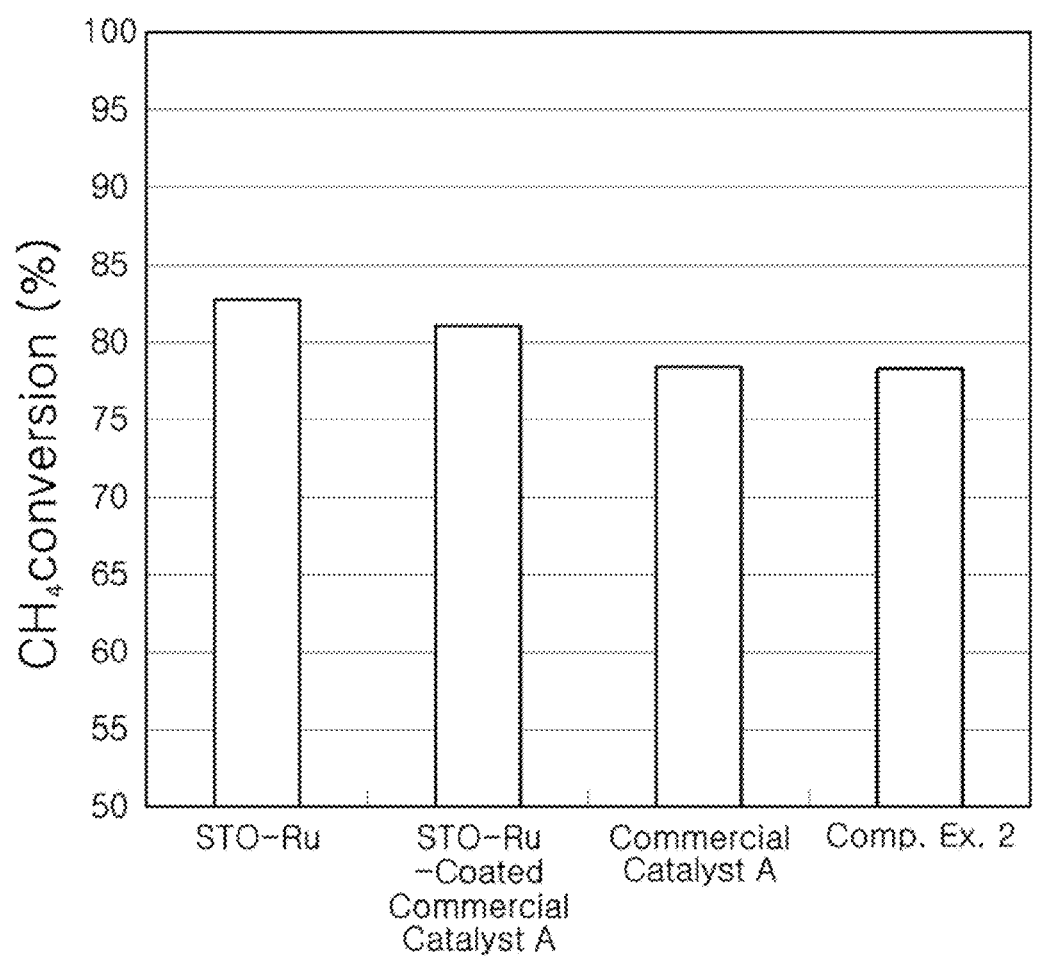
FIG. 5 is a graph showing the methane conversion (%) after carrying out a water vapor reforming test, when using each of the catalysts according to the Example 1 and Comparative Example 2, commercial catalyst A and catalyst A coated with the catalyst of the Example 1. Herein, each of the catalysts is subjected to reduction at 650° C. under $H_2$ atmosphere for 30 minutes and then to a water vapor reforming test at 650° C. under $H_2O/CH_4=2.5$.

FIG. 5 is a graph showing the methane conversion (%) after carrying out a water vapor reforming test, when using each of the catalysts according to the Example 1 and Comparative Example 2, commercial catalyst A and catalyst A coated with the catalyst of Example 1. Herein, each of the catalysts is subjected to reduction at 650° C. under $H_2$ atmosphere for 30 minutes and then to a water vapor reforming at 650° C. under $H_2O/CH_4=2.5$.

As can be seen from FIG. 5, in the case of methane conversion at 650° C., the catalyst according to the Example 1 ['STO—Ru' in the graph], the catalyst ['STO—Ru-coated commercial catalyst A' in the graph] including commercial catalyst A coated with the catalyst of the Example 1 [wherein the commercial catalyst A is a Catalyst No. 57-7 obtained from Synetix Company and having a composition of Ni/Ca/Al], the catalyst according to the Comparative Example 2, and the commercial catalyst A show a high average conversion of about 82%, 81%, 77% and 78%, respectively. The Comparative Example 1 shows little activity to water vapor reforming.

Figure 6:
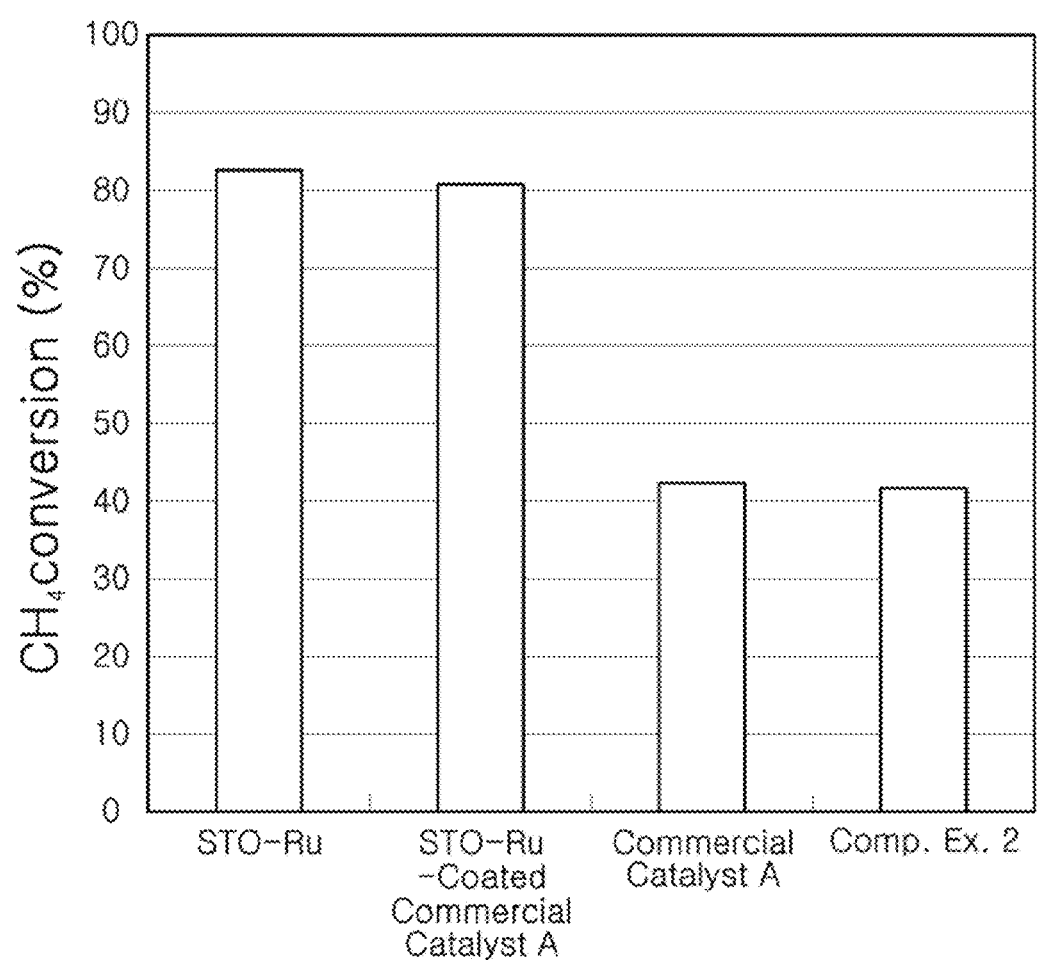
FIG. 6 is a graph showing the methane conversion (%) after carrying out a water vapor reforming test, when using each of the catalysts according to the Example 1 and Comparative Example 2, commercial catalyst A and catalyst A coated with the catalyst of the Example 1, wherein each of the catalysts is mixed with 10 wt % of molten carbonate containing 62 mol % $Li_2CO_3$/38 mol % $K_2CO_3$ based on the weight of each catalyst and then subjected to a water vapor reforming test. Herein, each catalyst is subjected to reduction at 650° C. under $H_2$ atmosphere for 30 minutes, and then to a water reforming test at 650° C. under the condition of $H_2O/CH_4=2.5$.

FIG. 6 is a graph showing the methane conversion (%) after carrying out a water vapor reforming test, when using each of the catalysts according to the Example 1 and Comparative Example 2, commercial catalyst A and catalyst A coated with the catalyst of the Example 1, wherein each of the catalysts is mixed with 10 wt % of molten carbonate containing 62 mol % $Li_2CO_3$/38 mol % $K_2CO_3$ based on the weight of each catalyst and then subjected to a water vapor reforming test. Herein, each catalyst is subjected to reduction at 650° C. under $H_2$ atmosphere for 30 minutes, and then to a water reforming test at 650° C. under the condition of $H_2O/CH_4=2.5$. Deactivation conditions include 650° C., 10 wt % of $(Li/K)_2CO_3$, after 100 hours. [For reference, 'deactivation' means a decrease in methane conversion. In this Experiment, a catalyst is mixed intentionally with 10 wt % of $(Li/K)_2CO_3$ for the purpose of deactivation, and methane conversion is determined].

As can be seen from FIG. 6, when a test of water vapor reforming of methane (650° C., the same conditions) is carried out after a catalyst is mixed with 10 wt % of molten carbonate salt including 62 mol % $Li_2CO_3$/38 mol % $K_2CO_3$ based on the weight of catalyst, the catalyst according to the Example 1 ['STO—Ru' in the graph], the catalyst ['STO—Ru-coated commercial catalyst A' in the graph] including commercial catalyst A coated with the catalyst of the Example 1, the catalyst according to the Comparative Example 2, and commercial catalyst A show an average conversion of about 82%, 80%, 41% and 42%, respectively. Only the catalyst according to the Example 1 or commercial catalyst A coated with the catalyst of the Example 1 show little poisoning with the molten carbonate electrolyte including 62 mol % $Li_2CO_3$/38 mol % $K_2CO_3$. Since an amount of 10 wt % based on the weight of catalyst corresponds to a poisoning amount after several ten thousands hours in case of actual MCFC operation, it is thought that the catalyst according to the Example 1 maintains excellent reforming quality as determined by a high methane conversion of about 80%, even after the operation for a long time of several ten thousands hours.

Figure 7:
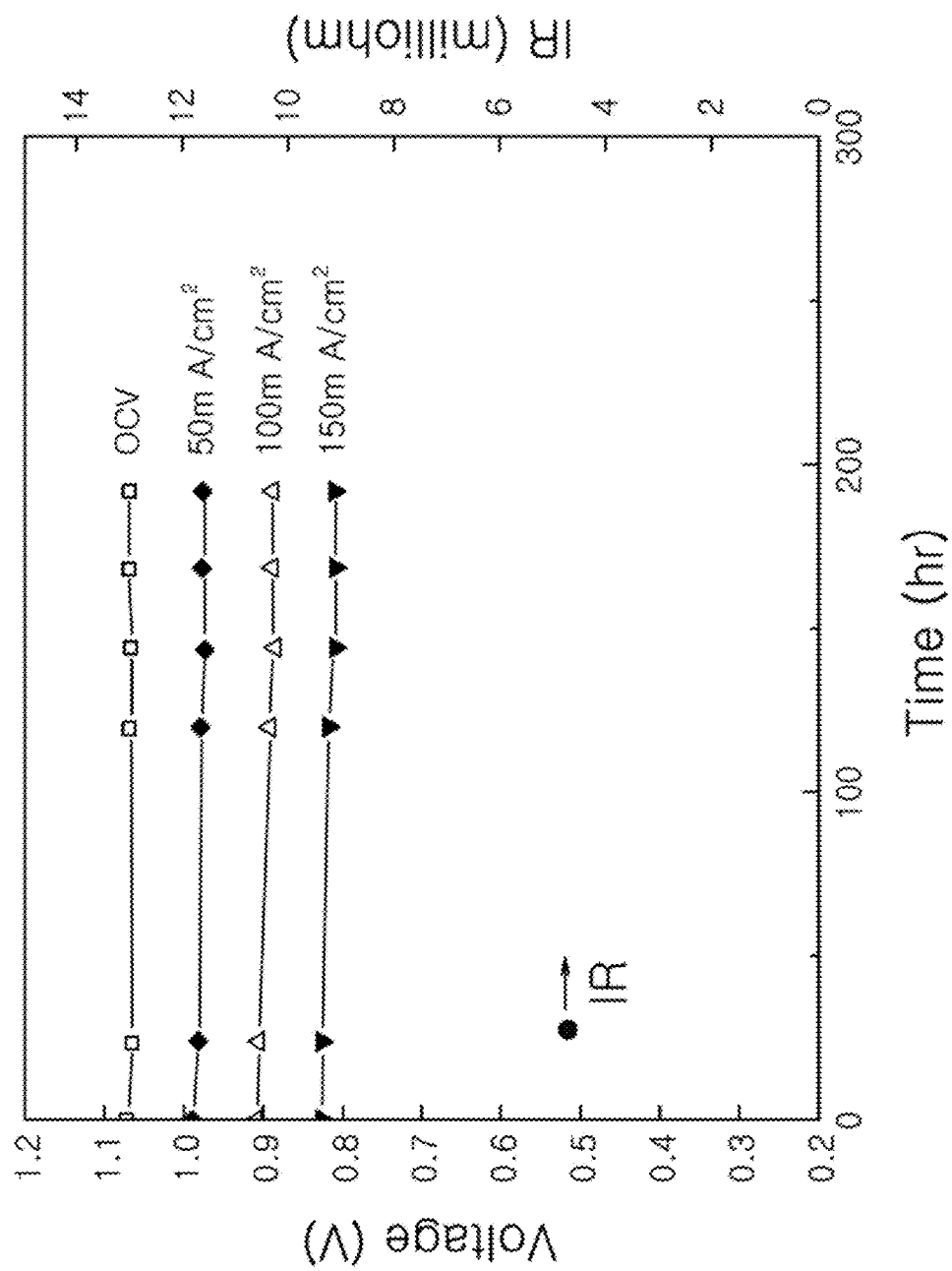
FIG. 7 is a graph illustrating the results of operation of a fuel cell in which the catalyst according to the Example 1 is mounted to a channel portion of an anode in a 10 cm×10 cm unit cell, under direct reforming conditions.

Meanwhile, FIG. 7 is a graph illustrating the results of operation of a fuel cell in which the catalyst according to the Example 1 is mounted to a channel portion of an anode in a 10 cm×10 cm unit cell, under direct reforming conditions.

For reference, the anode input gas is $H_2:CO_2:H_2O=72:18:10$ and the total flow rate is 400 ml/min. The cathode input gas is $Air:CO_2:H_2O=70:30$ and the total flow rate is 400 ml/min. The reforming conditions include $H_2O/CH_4=2.5$ and a total flow rate of 200 ml/min.

As shown in FIG. 7, after operating a 10 cm×10 cm unit cell in which the catalyst according to the Example 1 is mounted to the channel portion of an anode under direct reforming conditions (FIG. 7), the cell maintains high quality corresponding to at least 0.8V under the conditions of 650° C., 150 mA/cm² for at least 200 hours.

What is claimed is:

1. A direct reforming catalyst for molten carbonate fuel cells being a homogeneous catalyst having a single phase of Perovskite oxide, wherein at least one doping element is substituted at site A, site B or sites A and B in ABO3 Perovskite oxide,
wherein the direct reforming catalyst is a single-phase of Perovskite oxide represented by the following Chemical Formula 3:

$$A_{1-x}C_xB_{1-y}D_yO_3 \quad \text{[Chemical Formula 3]}$$

wherein x is larger than 0 and smaller than 1, and y is larger than 0 and smaller than 1;
A and B are elements different from each other and form site A and site B, respectively, in ABO3 Perovskite oxide, wherein A is Sr and B is Ti;
C and D are doping elements different from each other and have reforming characteristics to hydrocarbon fuel;
the $A_{1-x}C_xB_{1-y}D_yO_3$ Perovskite oxide has lower wettability with a liquid molten carbonate electrolyte as compared to $SrTiO_3$ Perovskite oxide; and
wherein each of C and D in Chemical Formula 3 is any one selected from the group consisting of Ru, Rd, Au, Ag, Pd, Cu, Ni and Pt.

* * * * *